United States Patent
Duckenfield et al.

(10) Patent No.: US 9,141,316 B1
(45) Date of Patent: Sep. 22, 2015

(54) METHODS AND SYSTEMS FOR IDENTIFYING PAPER-INTENSIVE PROCESSES

(71) Applicant: NewField Information Technology Ltd., Twickenham (GB)

(72) Inventors: James Jeffrey Duckenfield, Twickenham (GB); Ian Robert Birch, Workingham (GB); Geoffrey Philip Hogg, Thatcham (GB); Robert David Hoskins, Middlesex (GB); Gareth Ratcliffe, London (GB)

(73) Assignee: NEWFIELD INFORMATION TECHNOLOGY LTD., Twickenham (GB)

( * ) Notice: Subject to any disclaimer, the term of this patent is extended or adjusted under 35 U.S.C. 154(b) by 30 days.

(21) Appl. No.: 14/217,812

(22) Filed: Mar. 18, 2014

(51) Int. Cl.
*G06F 3/12* (2006.01)

(52) U.S. Cl.
CPC ............ *G06F 3/1219* (2013.01); *G06F 3/1203* (2013.01); *G06F 3/1257* (2013.01)

(58) Field of Classification Search
USPC ........................................................ 358/1.15
See application file for complete search history.

(56) References Cited

U.S. PATENT DOCUMENTS

| | | | |
|---|---|---|---|
| 5,625,384 A * | 4/1997 | Numata et al. ................... | 347/23 |
| 6,633,666 B2 * | 10/2003 | Gill et al. ....................... | 382/162 |
| 2002/0069228 A1 * | 6/2002 | Mori et al. ..................... | 707/524 |
| 2007/0263820 A1 * | 11/2007 | Czyszczewski et al. . | 379/201.12 |
| 2015/0095458 A1 * | 4/2015 | DeRoller et al. .............. | 709/219 |

\* cited by examiner

*Primary Examiner* — Ngon Nguyen
(74) *Attorney, Agent, or Firm* — Fox Rothschild LLP

(57) ABSTRACT

A method of identifying a paper-intensive process may include receiving quantitative processing data associated with a production environment, receiving qualitative processing data associated with the processing activities in the production environment, and generating a visual depiction of the processing activities. The visual depiction may include at least a portion of the received quantitative processing data and the received qualitative processing data, and the visual depiction may illustrate at least one paper-intensive process, one or more of a most common purpose associated with the paper-intensive process and a most common fate associated with the paper-intensive process. The method may include presenting the generated visual depiction to a user.

18 Claims, 7 Drawing Sheets

SELECT A GROUP

IDENTIFY A PROCESS

DO YOU PERFORM A PROCESSING ACTIVITY AS PART OF THIS PROCESS?

IF SO, WHICH ONE(S)?

WHAT IS THE PURPOSE OF PERFORMING THE PROCESSING ACTIVITY?

WHAT HAPPENS TO THE DOCUMENTS FOR WHICH THE PROCESSING ACTIVITY IS PERFORMED?

*FIG. 2*

METHODS AND SYSTEMS FOR IDENTIFYING PAPER-INTENSIVE PROCESSES

BACKGROUND

Business processes may have different degrees of paper intensiveness. Currently, capturing document usage within a process is performed manually. For example, an analyst can illustrate a process flow by preparing a flowchart. A wide range of processes are typically mapped and then reviewed to identify those that are paper-intensive. However, this process is inefficient and dependent on the skills and ability of the analyst.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, a method of identifying a paper-intensive process may include receiving quantitative processing data associated with a production environment. The quantitative processing data may include one or more metrics associated with one or more processing activities in the production environment. The method may include receiving qualitative processing data associated with the processing activities in the production environment. The qualitative processing data may include one or more of the following for one or more processes performed in the production environment over a period of time: an indication of a group that performed the process, an indication of a purpose associated with the process, or an indication of a fate of a document printed in connection with the process. The method may include generating a visual depiction of the processing activities. The visual depiction may include at least a portion of the received quantitative processing data and the received qualitative processing data, and the visual depiction may illustrate at least one paper-intensive process, one or more of a most common purpose associated with the paper-intensive process and a most common fate associated with the paper-intensive process. The method may include presenting the generated visual depiction to a user.

In an embodiment, a system for identifying a print-intensive process may include a computing device and a computer-readable storage medium in communication with the computing device. The computer-readable storage medium may include one or more programming instructions that, when executed, cause the computing device to receive quantitative processing data associated with a production environment and receive qualitative processing data associated with the processing activities in the production environment. The quantitative processing data may include one or more metrics associated with one or more processing activities in the print environment. The qualitative processing data may include one or more of the following for one or more processes performed in the production environment over a period of time: an indication of a group that performed the process, an indication of a purpose associated with the process, or an indication of a fate of a document printed in connection with the process. The computer-readable storage medium may include one or more programming instructions that, when executed, cause the computing device to generate a visual depiction of the processing activities and present the generated visual depiction to a user. The visual depiction may include at least a portion of the received quantitative processing data and the received qualitative processing data, and the visual depiction may illustrate at least one paper-intensive process, one or more of a most common purpose associated with the paper-intensive process and a most common fate associated with the paper-intensive process.

BRIEF DESCRIPTION OF THE DRAWINGS

FIGS. 2, 3A and 3B each illustrate an example survey that may be used to collect qualitative processing data according to an embodiment.

DETAILED DESCRIPTION

Figure 1:
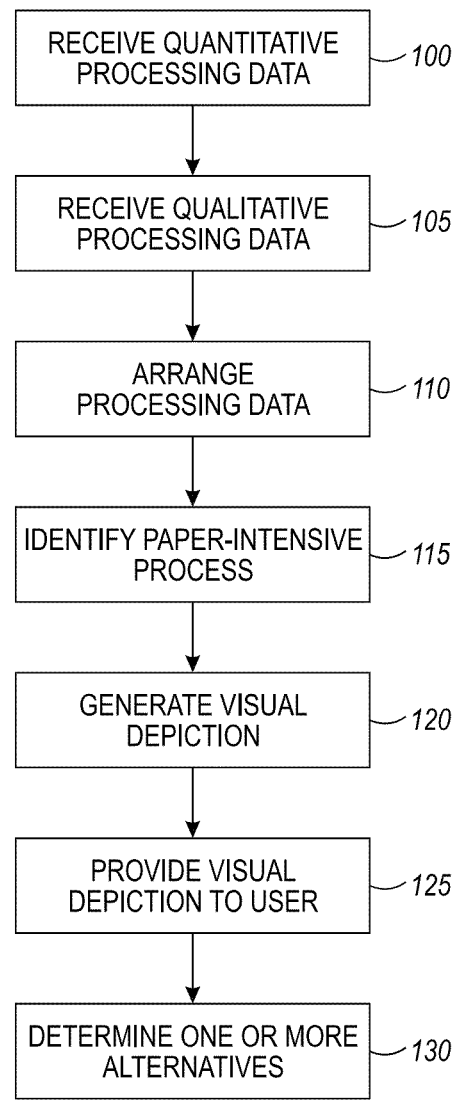
FIG. 1 illustrates an example method of identifying a paper-intensive process according to an embodiment.

The following terms shall have, for purposes of this application, the respective meanings set forth below:

A "computing device" refers to a device that includes a processor and non-transitory, computer-readable memory. The memory may contain programming instructions that, when executed by the processor, cause the computing device to perform one or more operations according to the programming instructions. As used in this description, a "computing device" may be a single device, or any number of devices having one or more processors that communicate with each other and share data and/or instructions. Examples of computing devices include personal computers, servers, mainframes, gaming systems, televisions, and portable electronic devices such as smartphones, personal digital assistants, cameras, tablet computers, laptop computers, media players and the like.

A "group" refers to a plurality of individuals who are involved in one or more workflows. A group may include an organization, a division, a business unit, a team, or another grouping of individuals.

A "job" refers to a logical unit of work that is to be completed. For example, in a print production environment, a job may include one or more print jobs from one or more clients.

"Paper" refers to a material on which information can be printed, written and/or the like. Examples of paper may include, without limitation, plain paper, thick paper, letterhead, bond paper, color paper, poser board, cardstock, envelopes, labels, coated paper and/or the like.

A "paper-intensive process" refers to a process that results in the use of paper that is proportionally higher than other processes within the same benchmark or comparison set. A benchmark or comparison set may include, for instance, a group, a company, or other organizational unit. For example, a paper-intensive process in a business organization may be one that requires a proportionally higher amount of one or more processing activities than other processes in the business organization.

A "print job" refers to a job processed in a print environment.

A "processing activity" refers to any paper-related process. Example processing activities may include, without limitation, black-and-white printing, color printing, single-sided printing, double-sided printing, copying, scanning, faxing, filing and/or the like.

A "production environment" refers to machine and/or human labor used to complete one or more jobs. An example production environment may include a print environment, such as, for example, offices, production environments, colleges or universities, or other organizations that perform one or more processing activities to complete one or more jobs.

A "production device" refers to a device used to process at least a portion of a job. Examples of production devices in a print environment may include, without limitation, printers, inserters, binders, punchers, collators, multi-function devices or other similar equipment and/or the like.

A "workflow" is a sequence of processes through which work passes from start through completion.

In an embodiment, a piece of work may be completed according to one or more workflows. A workflow may be a sequence of processes through which work passes from start through completion. A process may be a step or task that is performed to advance an item of work toward completion. In an embodiment, a process may be a manual process, a computer-implemented process or a combination of manual and computer-implemented processes.

In the context of a print production environment, an example workflow may correspond to sending a mailshot to customers. Example processes of the workflow may include: (1) drafting the content of the mailshot; (2) annotating; (3) approving; (4) storing; and (5) sending. Additional and/or alternate workflows and/or processes may be used within the scope of this disclosure.

In an embodiment, a workflow may include processes that are performed by different people, organizations, departments, business units, divisions, groups and/or the like. For example, steps (1), (2), (5) and (6) of the example workflow described above may be performed by an information technology group, while steps (3) and (4) may be performed by an accounting/finance group.

In an embodiment, an organization or other workflow administrator or owner may want to understand which processes of one or more workflows are paper-intensive. For example, a paper-intensive process may be one that generates at least 10% of a group's printed pages. In another embodiment, a paper-intensive process may be one that generates at least a threshold percentage of volume for a group over a period of time. For example, a paper-intensive process may be one that results in the scanning of at least 25% of a group's daily scanning. Additional and/or alternate threshold values and/or percentages may be used within the scope of this disclosure.

FIG. 1 illustrates an example method of identifying a paper-intensive process according to an embodiment. As illustrated by FIG. 1, quantitative processing data may be received 100. Quantitative processing data is one or more measureable print metrics associated with the processing activities for a user or group over a period of time. Examples of quantitative processing data may include how many print jobs are processed during a time period, how many pages are printed during the time period, an average number of print jobs or pages over the time period, an amount of a print consumable, such as toner, that is used during the time period, a quantity of filing used, a scanning volume and/or the like.

In an embodiment, quantitative processing data that is received 100 may correspond to a group's processing activities over a time period. For example, quantitative processing data may include the print volume of a business division over a time period. Quantitative processing data may include other information associated with one or more other groups within the scope of this disclosure.

Quantitative processing data may be received 100 from one or more production devices, computing devices and/or the like. For example, a print device may collect quantitative processing data for one or more print jobs that it processes. At least a portion of the quantitative processing data may be received 100 from the print device. As another example, a computing device may collect or track quantitative processing data for one or more print devices, and at least a portion of the quantitative processing data may be received from the computing device.

In an embodiment, at least a portion of the user or group responsible for the processing activity that corresponds, at least in part, to at least a portion of the received quantitative processing data may be determined. For instance, a computing device may receive qualitative processing data from two print devices, Print Device 1 and Print Device 2. Print Device 1 may be dedicated to a particular group, Group 1, while Print Device 2 may be dedicated to a different group, Group 2. The computing device may determine that the quantitative processing data received from Print Device 1 corresponds to Group 1 while the quantitative processing data received from Print Device 2 corresponds to Group 2.

In an embodiment, qualitative processing data may be received 105. Qualitative processing data is observable data associated with the processing activities of one or more processes for a user or group over a period of time. Example qualitative processing data may include a reason or purpose for performing a processing activity, a fate of one or more printed documents, the number of touch points in a process, the number of people involved in a process and/or the like. In an embodiment, qualitative processing data may include filing usage data. Filing usage data may be collected from one or more print devices or computing devices. Filing usage data may be collected by building, floor, group, individual and/or the like. In an embodiment, filing usage data may be associated with a floor space, format, category, number of images derived and/or the like.

At least a portion of qualitative processing data may be collected via a questionnaire, a survey and/or the like. In an embodiment, qualitative processing data may be collected via an electronic questionnaire, survey or other instrument. FIG. 2 illustrates an example survey that may be used to collect qualitative processing data.

As illustrated by FIG. 2, a survey may ask a respondent to identify a group to which they belong, and one or more processes in which they are involved. For each identified process, a user may be prompted to indicate whether the user performs a processing activity in performance of the process. If the user indicates that he or she does perform a processing activity as part of the process, the user may be prompted to identify the purpose for performing such processing activity. Example purposes may include, without limitation, to: (1) read now; (2) read later; (3) organize; (4) annotate; (5) sign; (6) archive; (7) remember; (8) share with people; (9) share as part of a meeting; and (10) share as part of a project. Additional and/or alternate purposes may be used within the scope of this disclosure.

As illustrated by FIG. 2, a survey may ask a respondent to identify the fate of a document associated with the processing activity. Example fates may include, without limitation: (1) disposal; (2) sharing with others; and (3) save, store or archive. Additional and/or alternate fates may be used within the scope of this disclosure.

Figure 3A:
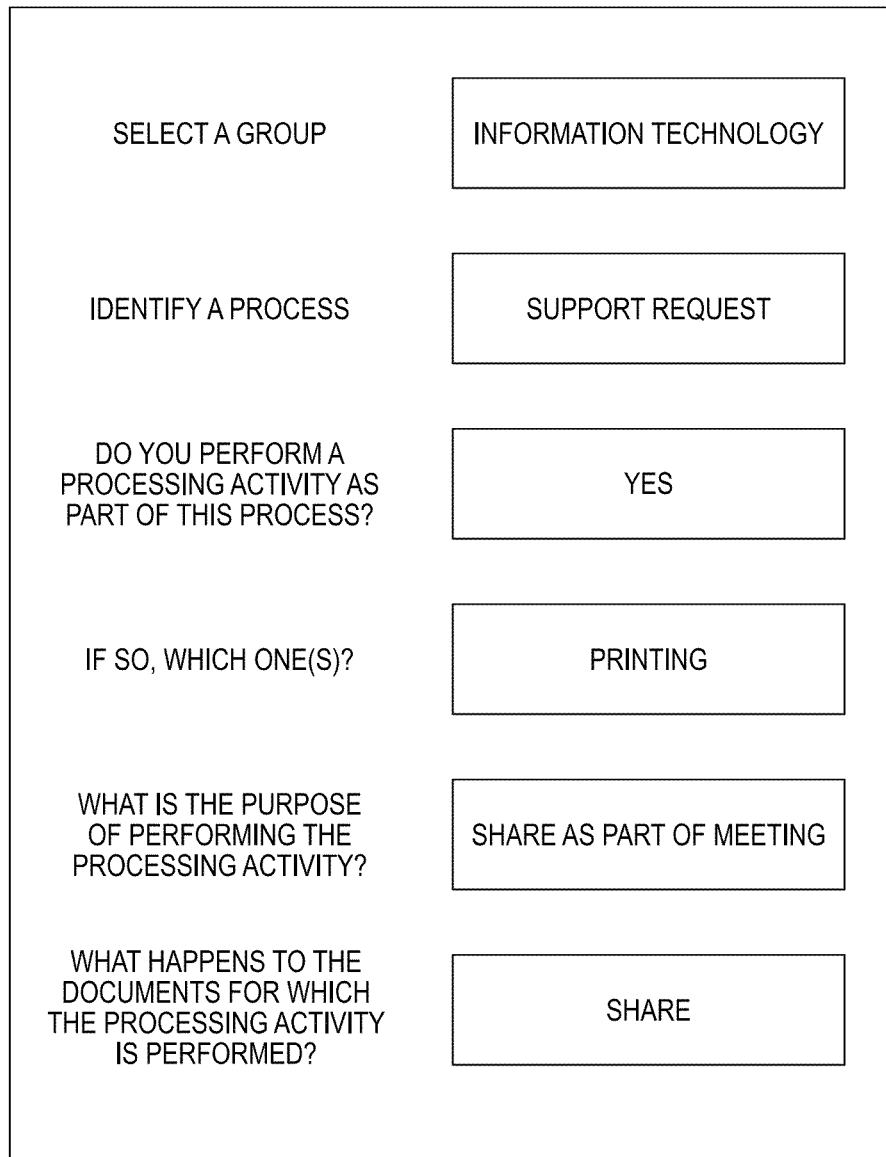

FIG. 3A illustrates an example of a completed survey according to an embodiment. As illustrated by FIG. 3A, the respondent is a member of the Information Technology group, and is involved in the support request process. The respondent indicates that she prints in performance of this process, and that the purpose for this printing is to share the request as part of a meeting. The respondent also indicates that the fate of the printed document is sharing.

Figure 3B:
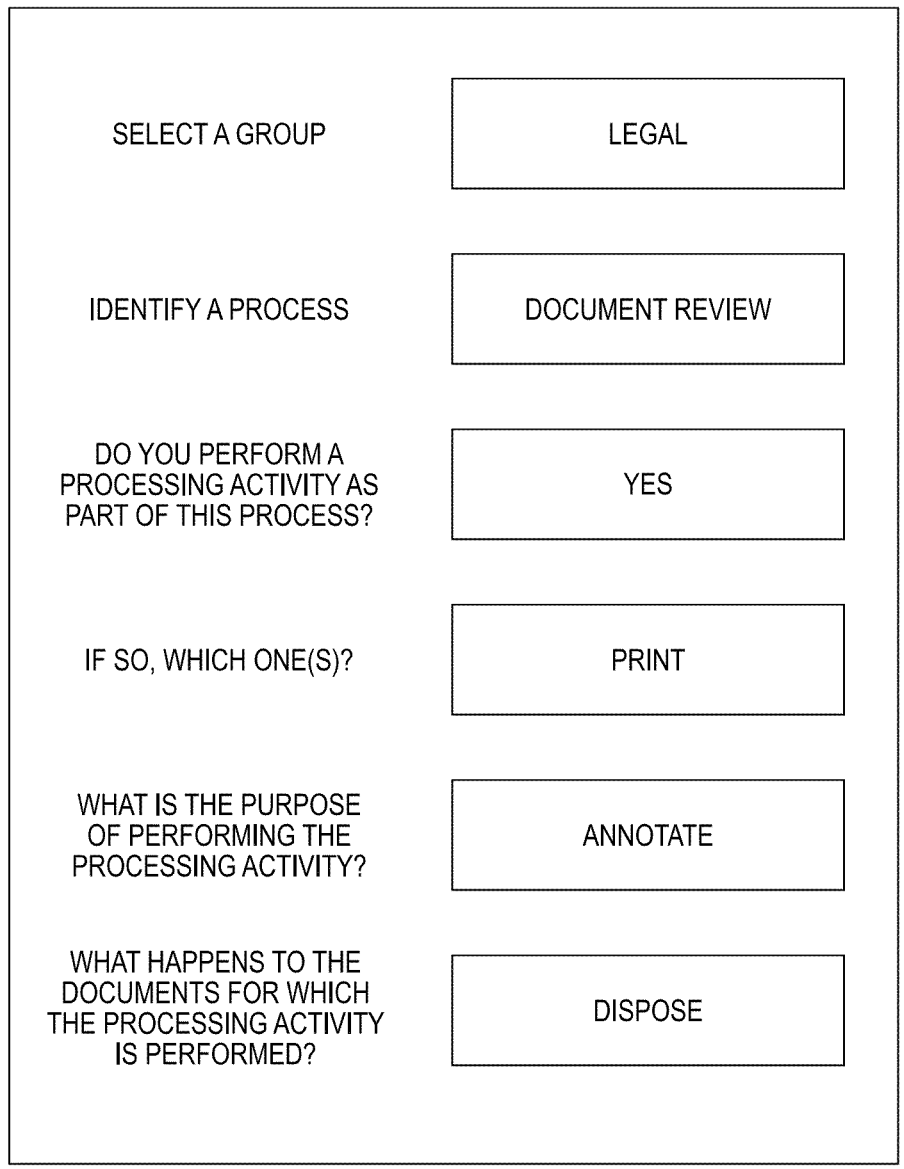

FIG. 3B illustrates another example of a completed survey according to an embodiment. As illustrated by FIG. 3B, the respondent is a member of the Legal group, and is involved in the document review process. The respondent indicates that he prints in performance of this process, and that the purpose of this printing is to annotate documents. The respondent also indicates that the fate of the printed document is disposal.

Figure 4:
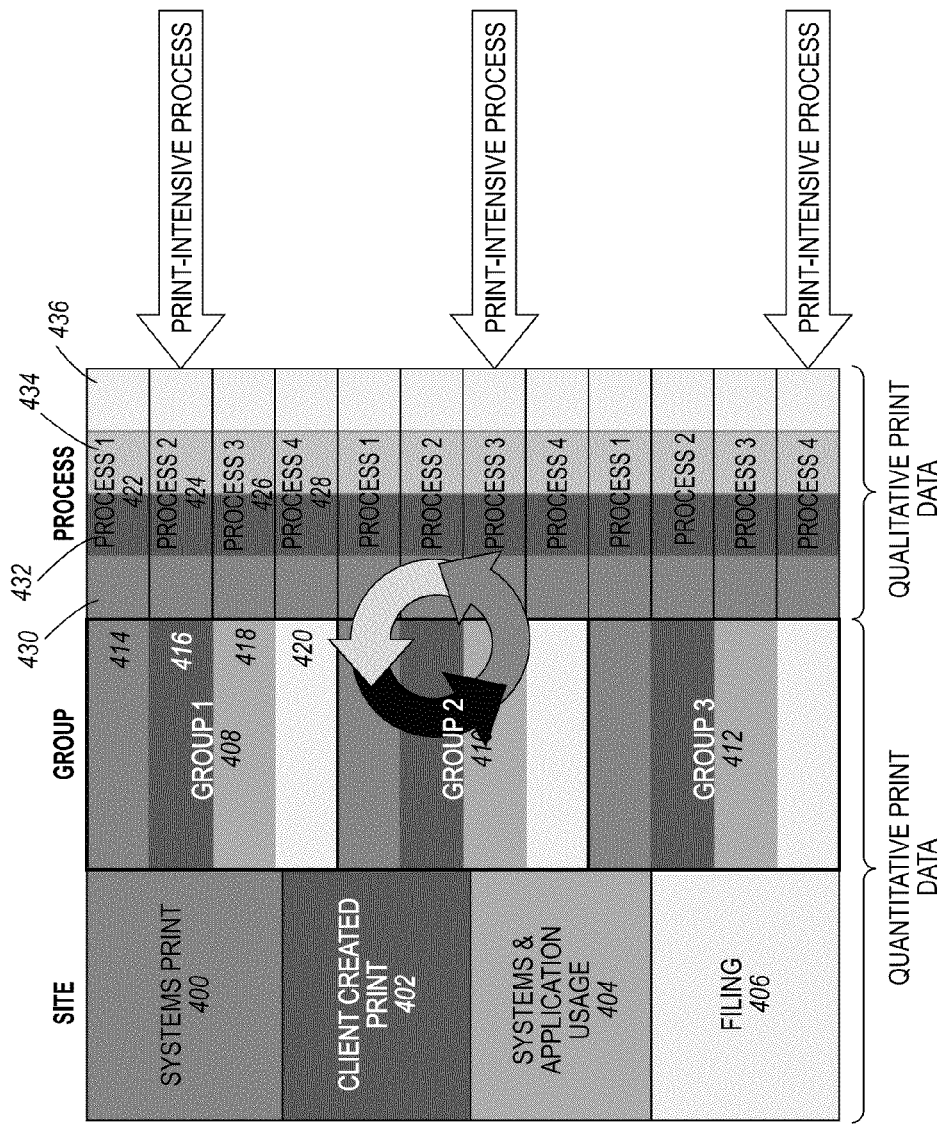
FIG. 4 illustrates an example arrangement of qualitative processing data and quantitative processing data according to an embodiment.

Referring back to FIG. 1, at least a portion of the quantitative processing data and qualitative processing data may be arranged 110 into one or more organization units. For example, as illustrated by FIG. 4, quantitative print data may be arranged 110 by corresponding site or other location. A site may refer to geographic location. For example, a site may refer to a one or more buildings at a geographic site. Additional and/or alternate sites may be used within the scope of this disclosure. FIG. 4 illustrates four example sites: (1) systems print 400; (2) client created print 402; (3) systems and application usage 404; and (4) filing 406.

In an embodiment, at least a portion of quantitative processing data may be arranged 110 by corresponding group. For instance, FIG. 4 illustrates three example groups: (1) Group 1 408; (2) Group 2 410; and (3) Group 3 412. Each group may be illustrated as a composition of one or more sites. For instance, Group 1 408 of FIG. 4 is a composition of all four illustrated sites (systems print 414, client created print 416, systems and application usage 418, and filing 420).

In an embodiment, at least a portion of the qualitative processing data may be incorporated into at least a portion of the quantitative processing data and arranged 110 by process. For example, qualitative processing data may be used to identify one or more processes associated with one or more groups. Qualitative processing data may also be used to illustrate which site or combinations of sites contribute to performance of the process. For instance, FIG. 4 illustrates that Process 1 422, Process 2 424, Process 3 426 and Process 4 428 are associated with Group 1 408. All four sites (systems print 430, client created print 432, systems and application usage 434, and filing 436) contribute to the performance of Process 1 422. As such, qualitative processing data may be arranged by processing using qualitative processing data. In an embodiment, one or more statistical methods may be used for the derivation of the most appropriate aggregations of the data to a single value for the purpose of displaying, reporting and/or the like. Example statistical methods may include, without limitation, Factor Analysis/Regression Analysis, latent semantic analysis, standard deviation, standard error analysis and/or the like.

Referring back to FIG. 1, one or more paper-intensive processes may be identified 115. In an embodiment, a paper-intensive process may be identified using at least a portion of the arranged qualitative processing data and/or quantitative processing data. For example, referring to FIG. 4, Process 2 associated with Group 1, Process 3 associated with Group 2 and Process 4 associated with Group 3 may each be identified as paper-intensive processes.

Figure 5:
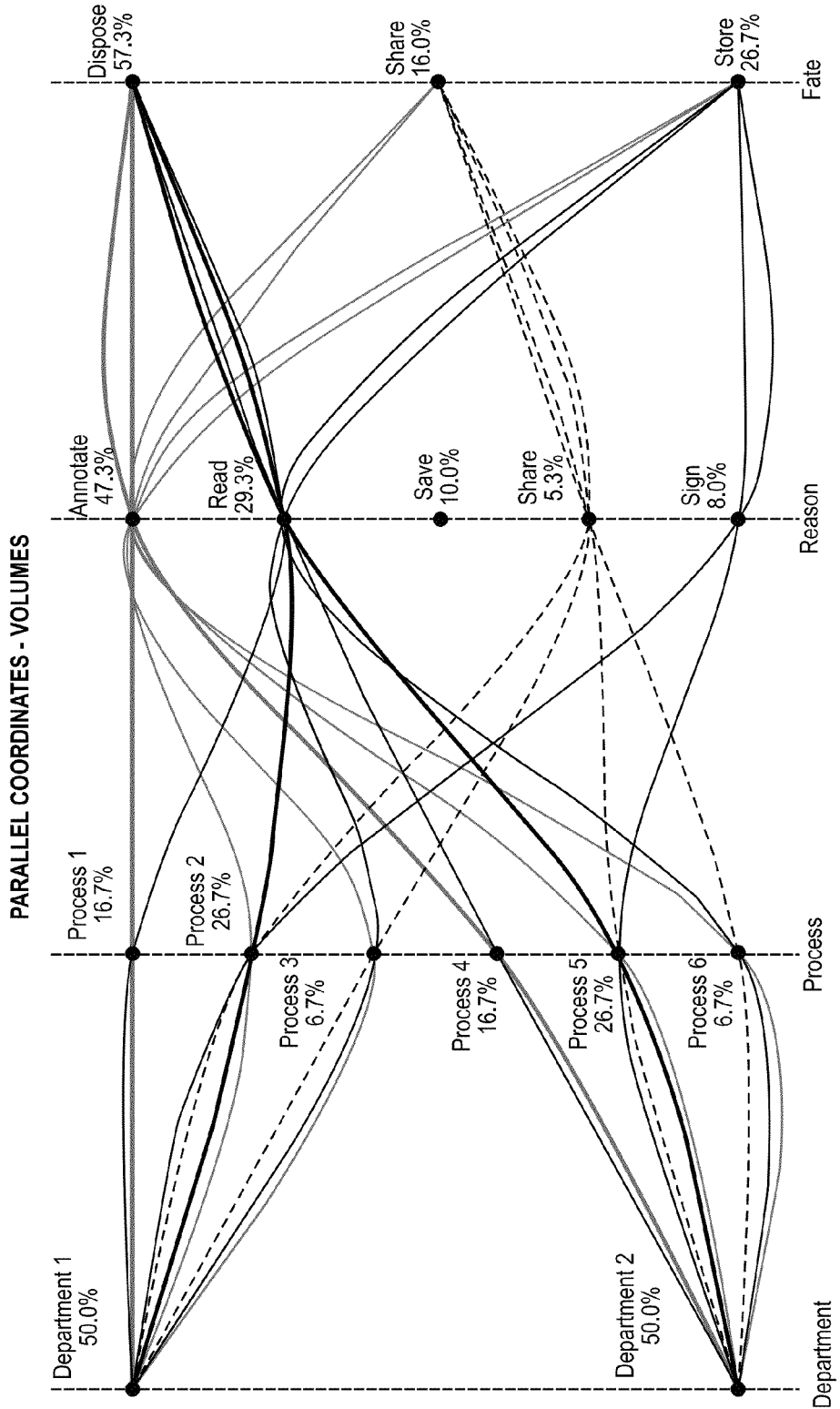
FIG. 5 illustrates an example visual depiction of processing activities according to an embodiment.

In an embodiment, a visual depiction of production activities by group, process, purpose and/or fate may be generated 120. For example, a graph showing the breakdown of processing activity by one or more groups across one or more processes, purposes and fates may be generated 120. FIG. 5 illustrates an example graph according to an embodiment. The processing activities of two departments (Department 1 and Department 2) are illustrated across six different processes (Process 1, Process 2, Process 3, Process 4, Process 5 and Process 6), five different purposes (annotate, read, save, share and sign), and three different fates (dispose, share, and store). As illustrated by FIG. 5, a visual depiction may illustrate a most common origin, purpose and/or fate of one or more paper-intensive process. Additional and/or alternate groups, processes, purposes and/or fates may be used within the scope of this disclosure.

As illustrated by FIG. 5, 50% of processing activities originate from Department 1 while the other 50% of processing activities originate from Department 2. The most paper-intensive processes are Process 2 and Process 5. The most common purpose for processing activities is to annotate, and the most common fate for printed documents is disposal.

In an embodiment, the generated visual depiction may be provided 125 to one or more users. A visual depiction may be displayed on a display device or emailed to a user.

In an embodiment, at least a portion of the information provided in the visual depiction may be used by a computing device to determine 130 one or more alternatives to a paper-intensive process. A visual depiction may help a user, such as an analyst, quickly recognize paper-intensive processes and be able to understand in what context these processes are being used. For instance, using the example above, an analyst reviewing the depiction of FIG. 5 can recognize that Process 2 and Process 5 are each contributing 26.7% of the total processing activities, that the primary reason for this printing is for annotation, and that the majority of this printing is simply discarded. This information may be used to determine 130 one or more less paper-intensive alternatives. Example alternatives may include, for instance, implementation of paperless annotation capabilities, implementation of electronic signatures, a change to one or more workflows and/or the like. The one or more suggestions may be presented to one or more users such as, for example, on a display device, via email and/or the like.

Figure 6:
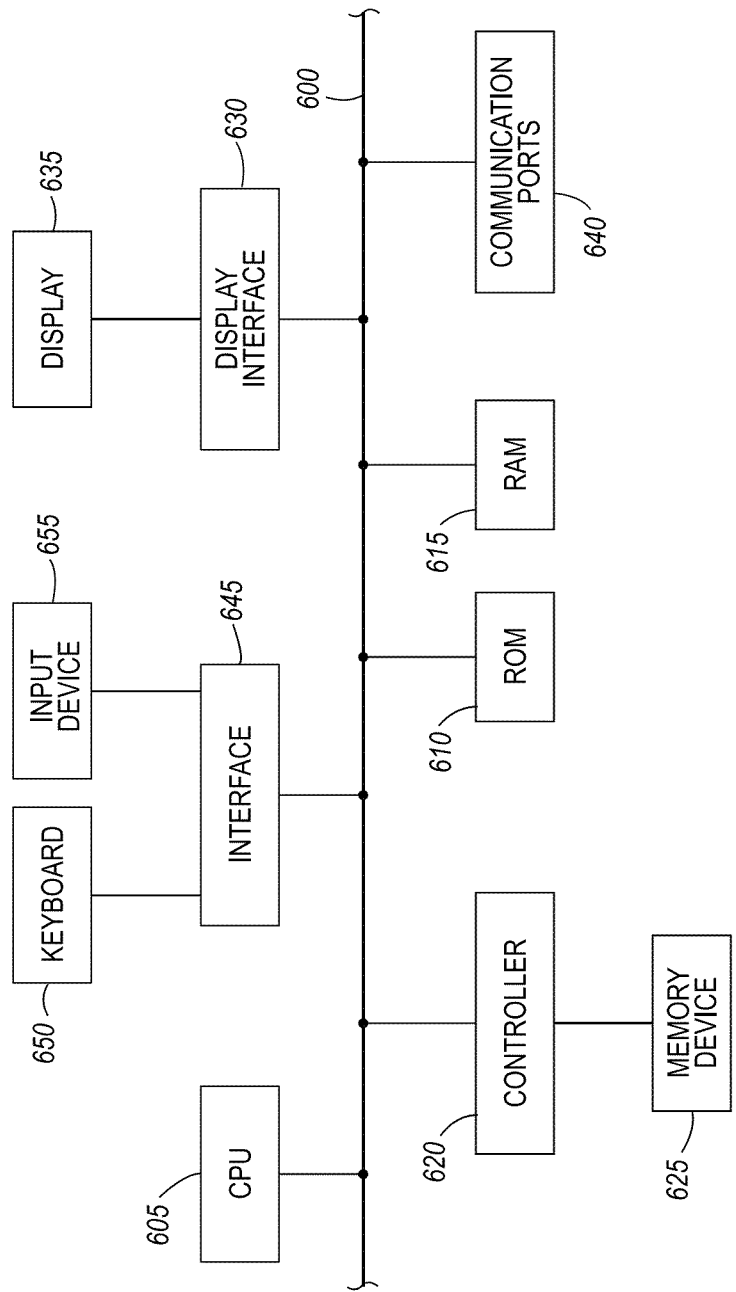
FIG. 6 illustrates a block diagram of example hardware that may be used to contain or implement program instructions according to an embodiment.

FIG. 6 depicts a block diagram of hardware that may be used to contain or implement program instructions. A bus 600 serves as the main information highway interconnecting the other illustrated components of the hardware. CPU 605 is the central processing unit of the system, performing calculations and logic operations required to execute a program. CPU 605, alone or in conjunction with one or more of the other elements disclosed in FIG. 6, is an example of a production device, computing device or processor as such terms are used within this disclosure. Read only memory (ROM) 610 and random access memory (RAM) 615 constitute examples of non-transitory computer-readable storage media.

A controller 620 interfaces with one or more optional non-transitory computer-readable storage media 625 to the system bus 600. These storage media 625 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 610 and/or the RAM 615. Optionally, the program instructions may be stored on a tangible, non-transitory computer-readable medium such as a compact disk, a digital disk, flash memory, a memory card, a USB drive, an optical disc storage medium and/or other recording medium.

An optional display interface 630 may permit information from the bus 600 to be displayed on the display 635 in audio, visual, graphic or alphanumeric format. Communication with external devices, such as a printing device, may occur using various communication ports 640. A communication port 640 may be attached to a communications network, such as the Internet or an intranet.

The hardware may also include an interface 645 which allows for receipt of data from input devices such as a keyboard 650 or other input device 655 such as a mouse, a joystick, a touch screen, a remote control, a pointing device, a video input device and/or an audio input device.

It will be appreciated that the various above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A method of identifying a paper-intensive process, the method comprising:
by a processor:
receiving quantitative processing data associated with a production environment, wherein the quantitative processing data comprises one or more metrics associated with one or more processing activities in the production environment;
receiving qualitative processing data associated with the processing activities in the production environment, wherein the qualitative processing data comprises one or more of the following for one or more processes performed in the production environment over a period of time:
an indication of a group that performed the process,
an indication of a purpose associated with the process, or
an indication of a fate of a document printed in connection with the process;
generating a visual depiction of the processing activities, wherein the visual depiction comprises at least a portion of the received quantitative processing data and the received qualitative processing data, wherein the visual depiction illustrates at least one paper-intensive process, one or more of a most common purpose associated with the paper-intensive process and a most common fate associated with the paper-intensive process; and
presenting the generated visual depiction to a user.

2. The method of claim 1, wherein receiving quantitative processing data associated with a production environment comprises receiving quantitative processing data from one or more print devices.

3. The method of claim 1, wherein receiving quantitative processing data comprises receiving one or more of the following:
a number of print jobs that are printed during the period of time;
a number of pages that are printed during the period of time;
an average number of print jobs printed during the period of time;
an average number of pages that are printed during the period of time;
a volume of pages that are faxed during the period of time;
a volume of scans during the period of time; and
a volume of filing over the period of time.

4. The method of claim 1, wherein receiving qualitative processing data associated with the processing activities in the production environment comprises receiving at least a portion of the qualitative processing data from an electronic survey.

5. The method of claim 1, wherein generating a visual depiction of the processing activities, comprises, generating a visual depiction that illustrates, for each process:
an indication of the group responsible for originating the process during the period of time,
an indication of every purpose for paper associated with the process during the period of time, and
an indication of every fate for paper associated with the process during the period of time.

6. The method of claim 5, wherein generating a visual depiction that illustrates an indication of every purpose for paper associated with the process during the period of time comprises generating a visual depiction that illustrates, for each purpose, an indication of a volume of the paper used in the process associated with the purpose.

7. The method of claim 5, wherein generating a visual depiction that illustrates an indication of every fate for the paper associated with the process during the period of time comprises generating a visual depiction that illustrates, for each fate, an indication of a volume of the paper used in the process associated with the fate.

8. The method of claim 1, wherein presenting the generated visual depiction to a user comprises displaying the generated visual depiction on a display device.

9. The method of claim 1, further comprising:
determining one or more alternatives to the paper-intensive process; and
presenting the one or more alternatives to the user.

10. A system for identifying a print-intensive process, the system comprising:
a computing device; and
a non-transitory computer-readable storage medium in communication with the computing device, wherein the computer-readable storage medium comprises one or more programming instructions that, when executed, cause the computing device to:
receive quantitative processing data associated with a production environment, wherein the quantitative processing data comprises one or more metrics associated with one or more processing activities in the print environment,
receive qualitative processing data associated with the processing activities in the production environment, wherein the qualitative processing data comprises one or more of the following for one or more processes performed in the production environment over a period of time:
an indication of a group that performed the process, an indication of a purpose associated with the process, or an indication of a fate of a document printed in connection with the process;

generate a visual depiction of the processing activities, wherein the visual depiction comprises at least a portion of the received quantitative processing data and the received qualitative processing data, wherein the visual depiction illustrates at least one paper-intensive process, one or more of a most common purpose associated with the paper-intensive process and a most common fate associated with the paper-intensive process; and present the generated visual depiction to a user.

11. The system of claim 10, wherein the one or more programming instructions that, when executed, cause the computing device to receive quantitative processing data associated with a production environment comprise one or more programming instructions that, when executed, cause the computing device to receive quantitative processing data from one or more print devices.

12. The system of claim 10, wherein the one or more programming instructions that, when executed, cause the computing device to receive quantitative processing data comprise one or more programming instructions that, when executed, cause the computing device to receive one or more of the following:

a number of print jobs that are printed during the period of time;

a number of pages that are printed during the period of time;

an average number of print jobs printed during the period of time;

an average number of pages that are printed during the period of time;

a volume of pages that are faxed during the period of time;

a volume of scans during the period of time; and a volume of filing over the period of time.

13. The system of claim 10, wherein the one or more programming instructions that, when executed, cause the computing device to receive qualitative processing data associated with the processing activities in the print environment comprise one or more programming instructions that, when executed, cause the computing device to receive at least a portion of the qualitative processing data from an electronic survey.

14. The system of claim 10, wherein the one or more programming instructions that, when executed, cause the computing device to generate a visual depiction of the print activities, comprise one or more programming instructions that, when executed, cause the computing device to generate a visual depiction that illustrates, for each process:

an indication of the group responsible for originating the process during the period of time, an indication of every purpose for paper associated with the process during the period of time, and an indication of every fate for paper associated with the process during the period of time.

15. The system of claim 14, wherein the one or more programming instructions that, when executed, cause the computing device to generate a visual depiction that illustrates an indication of every purpose for paper associated with the process during the period of time comprise one or more programming instructions that, when executed, cause the computing device to generate a visual depiction that illustrates, for each purpose, an indication of a volume of paper used in the process associated with the purpose.

16. The system of claim 14, wherein the one or more programming instructions that, when executed, cause the computing device to generate a visual depiction that illustrates an indication of every fate associated with the process during the period of time comprise one or more programming instructions that, when executed, cause the computing device to generate a visual depiction that illustrates, for each fate, an indication of a volume of paper used in the process associated with the fate.

17. The system of claim 10, wherein the one or more programming instructions that, when executed, cause the computing device to present the generated visual depiction to a user comprise one or more programming instructions that, when executed, cause the computing device to display the generated visual depiction on a display device.

18. The system of claim 10, wherein the non-transitory computer-readable storage medium further comprises one or more programming instructions that, when executed, cause the computing device to:

determine one or more alternatives to the paper-intensive process; and present the one or more alternatives to the user.

* * * * *